Patented May 8, 1951

2,552,269

UNITED STATES PATENT OFFICE 2,552,269

PLASTICIZED POLYVINYL HALIDES

William S. Emerson and Robert A. Heimsch, Dayton, Ohio, assignors to Monsanto Chemical Company, St. Louis, Mo., a corporation of Delaware No Drawing. Application March 25, 1950, Serial No. 151,991

8 Claims. (Cl. 260—30.8)

This invention relates to compositions comprising polymers of vinyl halides and relates more particularly to compositions comprising vinyl chloride polymers plasticized with 2-ethylhexyl esters of certain aromatic dicarboxylic acids.

A wide variety of plasticizers has been employed for the purpose of improving the physical properties of vinyl chloride polymers. Particular attention has been given to the improvement of flexibility and heat- and light-stability of such plasticized compositions. In many instances the improvement in flexibility has been obtainable only by sacrificing other desirable properties of an ideal polyvinyl chloride composition, such as low volatility, color and heat-stability, water absorption, etc.

Now we have found that very good flexibility, without sacrifice of temperature stability and low volatility, is imparted to vinyl chloride polymers when there are employed with the polymers 2-ethylhexyl esters of aromatic dibasic acids having a plurality of benzene nuclei and ether or thioether structures. Esters of this type are disclosed in our copending application, Serial No. 135,301, filed December 27, 1949.

The esters may be represented by the generic structural formula:

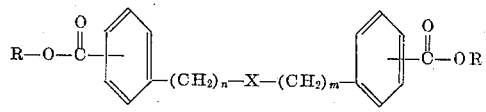

wherein X is an atom selected from the group consisting of oxygen and sulfur atoms, $n$ and $m$ are each small whole numbers from zero to one, inclusive, the sum of $m$ and $n$ is at least one, and R is the radical $$-CH_2CH(CH_2)_3CH_3$$
$$\quad\;\; |$$
$$\quad\;\; C_2H_5$$

As illustrative of esters having the above general formula may be mentioned the bis(2-ethylhexyl) esters of bis(o-carboxybenzyl) sulfide, of bis(p-carboxybenzyl) ether, of p-carboxybenzyl p-carboxyphenyl sulfide, and of p-carboxybenzyl p-carboxyphenyl ether.

The new esters of the aromatic dicarboxylic acids may be prepared from ortho-, meta-, or para-toluic acids by treatment first with thionyl chloride to form the acid chloride and then by chlorination to form the chloromethylbenzoyl chloride. The latter compound is then converted to the acid by hydrolysis and reacted in alkaline solution with a compound of the type:

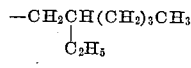

wherein X is a sulfur or an oxygen atom and $n$ is a small whole number from zero (0) to one (1), inclusive. The dibasic acids are then precipitated from the aqueous alkaline solution by treatment with a strong mineral acid, and esterified by refluxing with 2-ethylhexanol in the presence of an esterification catalyst.

An alternative procedure for preparing the symmetrical thioether involves the reaction of two moles of the chloromethylbenzoic acid with one mole of an alkali metal sulfide in aqueous alkaline solution, and followed by esterification.

The present esters are valuable plasticizers for polyvinyl chloride and copolymers of at least 70 per cent by weight of vinyl chloride and up to 30 per cent by weight of an unsaturated monomer copolymerized therewith, for example, vinyl acetate, vinylidene chloride, etc. We have found these esters serve not only to soften vinyl chloride polymers, but also to impart simultaneously a high degree of low temperature flexibility, very good temperature stability and great mechanical strength to these polymers. The present 2-ethylhexyl esters are compatible with vinyl chloride polymers and show no exudation of plasticizer content of up to 50 per cent. Although the quantity of plasticizer will depend upon the particular polymer to be plasticized and upon its molecular weight, it is generally found that compositions having from 5 per cent to 50 per cent by weight of plasticizer will, in most cases, be satisfactory for general utility. The good flexibility of the plasticized compositions increases with increasing plasticizer concentration.

In evaluating plasticizer efficiency, use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument Company is used for this determination and expresses the hardness in units from 1 to 100. The hardness of a composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexibile compositions at room temperature the flexibility of these compositions at low temperatures may vary considerably, i. e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. This value may also be defined as the lower temperature limit of the plasticized composition's usefulness as an elastomer.

*Volatility.*—Just as a decrease in temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization the plasticized compositions become stiff and hard. The test for plasticizer volatility herein employed is that described by the American Society for Testing Materials under the designation D-744-44T.

*Water resistance.*—The amount of water absorption and the amount of leaching that takes place when the plasticized composition is immersed in distilled water for 24 hours is determined.

The invention is further illustrated, but not limited by the following examples:

Example 1

Sixty parts of polyvinyl chloride and 40 parts by weight of the bis(2-ethylhexyl) ester of bis-(p-carboxybenzyl) sulfide are mixed on a rolling mill to a homogeneous blend. During the milling there was observed substantially no fuming and discoloration. A molded sheet of the mixture was clear and transparent and substantially colorless. Testing of the molded sheet for low temperature flexibility, according to the testing procedure described above, gave a value of minus 19° C., which value denotes good low temperature properties. Tests on the volatility characteristics of the plasticized composition gave a value of 2.2 per cent which shows very good retention of plasticizer and indicates good temperature characteristics of the composition. The plasticized material had a hardness of 77 before the volatility test and a hardness of 76 after the volatility test. When subjected to heat at a temperature of 325° F. for a period of 30 minutes the clarity and color of the molded product was substantially unchanged. Tests of the water-resistance properties of the plasticized material employing the test procedure described above showed a solids-loss of only 0.06 per cent and an 0.34 per cent water absorption value.

Example 2

Operating as in Example 1, but employing the bis(2-ethylhexyl) ester of p-carboxybenzyl p-carboxyphenyl ether instead of the ester employed in Example 1, there was obtained a plasticized polyvinyl chloride composition having a low-temperature flexibility value of minus 12° C. Tests on the volatility characteristics of the plasticized composition gave a value of 1.3 per cent, which value shows very good retention of the plasticizer. The plasticized material had a hardness of 78 before the volatility test and a hardness of 77 after the volatility test. When subjected to heat as in Example 1, the color of the present molded product was substantially unchanged. Tests of the water-resistance properties of the present product gave a solids-loss of 0.05 per cent and an 0.29 per cent water absorption value.

Example 3

Operating as in Example 1, but employing the bis-(2-ethylhexyl) ester of p-carboxylbenzyl p-carboxyphenyl sulfide instead of the ester of Example 1, there was obtained a plasticized polyvinyl chloride composition having a low temperature flexibility value of −16° C. Tests on the volatility characteristics of the plasticized composition gave a value of 1.10 per cent which shows very good retention of plasticizer and indicates good temperature characteristics of the composition. The plasticized material had a hardness of 77 before the volatility test and a hardness of 76 after the volatility test. Tests of the water-resistance properties of the plasticized material employing the test procedure described above showed a solids-loss of only 0.03 per cent and an 0.43 per cent water absorption value.

While the above examples show only a composition in which the ratio of plasticizer to polymer content is 40:60, this ratio being employed in order to get comparable efficiencies, the content of ester to polyvinyl chloride may be widely varied, depending upon the properties desired in the final product. For many purposes a plasticizer content of, say, from only 10 per cent to 20 per cent is preferred. The present esters are compatible with polyvinyl chloride over a wide range of concentrations, up to 50 per cent of esters based on the total weight of the plasticized composition yielding desirable products.

Although the invention has been described particularly with reference to the use of the present bis(2-ethylhexyl) esters of bis(carboxyaryl) ethers or sulfides as plasticizers for polyvinyl chloride, these esters are advantageously employed also as plasticizers for copolymers of vinyl chloride, for example, the copolymers of vinyl chloride with vinyl acetate, vinylidene chloride, methyl methacrylate, acrylonitrile, butadiene, or styrene. Preferably, such copolymers have a high vinyl chloride content, i. e., a vinyl chloride content of at least 70 per cent by weight of vinyl chloride and up to 30 per cent by weight of the copolymerizable monomer.

The plasticized polyvinyl halide compositions of the present invention have good thermal stability; however, for many purposes it may be advantageous to use known stabilizers in the plasticized compositions. Inasmuch as the present esters are substantially unreactive with the commercially available heat- and light-stabilizers which are commonly employed with polyvinyl chloride or copolymers thereof, the presence of such materials in the plasticized materials does not impair the valuable properties of the present esters. The present esters are of general utility in softening vinyl chloride polymers. They may be used as the only plasticizing component in a compounded vinyl chloride polymer or they may be used in conjunction with other plasticizers.

What we claim is:

1. A resinous composition comprising a vinyl chloride polymer plasticized with an ester having the structure:

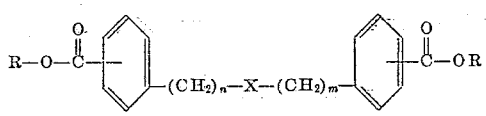

wherein X is an atom selected from the group consisting of oxygen and sulfur atoms, $n$ and $m$ are each small whole numbers from zero to one, inclusive, the sum of $m$ and $n$ is at least one, and R is the radical

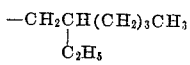

2. A resinous composition comprising polyvinyl chloride plasticized with an ester having the structure:

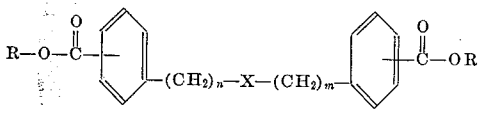

wherein X is an atom selected from the group consisting of oxygen and sulfur atoms, $n$ and $m$ are each small whole numbers from zero to one, inclusive, the sum of $m$ and $n$ is at least one, and R is the radical

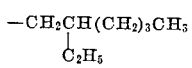

3. A resinous composition comprising polyvinyl chloride plasticized with an ester having the structure:

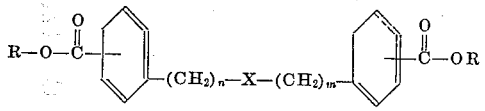

wherein X is an atom selected from the group consisting of oxygen and sulfur atoms, $n$ and $m$ are each small whole numbers from zero to one, inclusive, the sum of $m$ and $n$ is at least one, and R is the radical

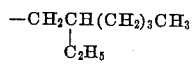

said ester being from 5 to 50 per cent of the weight of the composition.

4. A resinous composition comprising a vinyl chloride polymer plasticized with an ester having the structure:

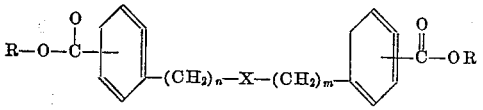

wherein X is an atom selected from the group consisting of oxygen and sulfur atoms, $n$ and $m$ are each small whole numbers from zero to one, inclusive, the sum of $m$ and $n$ is at least one, and R is the radical

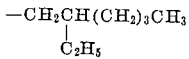

said ester being from 5 to 50 per cent of the weight of the composition.

5. A resinous composition comprising a copolymer of at least 70 per cent by weight of vinyl chloride and up to 30 per cent by weight of an unsaturated monomer copolymerizable therewith, said copolymer being plasticized with an ester having the structure:

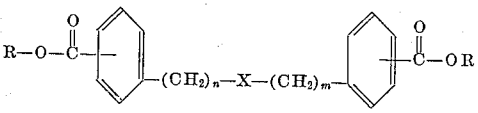

wherein X is an atom selected from the group consisting of oxygen and sulfur atoms, $n$ and $m$ are each small whole numbers from zero to one, inclusive, the sum of $m$ and $n$ is at least one, and R is the radical

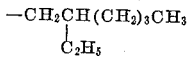

and said ester being from 5 to 50 per cent of the weight of the composition.

6. A resinous composition comprising polyvinyl chloride plasticized with the bis(2-ethylhexyl) ester of bis(p-carboxybenzyl) sulfide, said ester being from 5 to 50 per cent of the weight of the composition.

7. A resinous composition comprising polyvinyl chloride plasticized with the bis(2-ethylhexyl) ester of p-carboxybenzyl p-carboxyphenyl ether, said ester being from 5 to 50 per cent of the weight of the composition.

8. A resinous composition comprising polyvinyl chloride plasticized with the bis(2-ethylhexyl) ester of p-carboxybenzyl p-carboxyphenyl sulfide, said ester being from 5 to 50 per cent of the weight of the composition.

WILLIAM S. EMERSON.
ROBERT A. HEIMSCH.

No references cited.